United States Patent
Bodin et al.

[11] Patent Number: 5,816,595
[45] Date of Patent: Oct. 6, 1998

[54] WHEEL AXLE

[75] Inventors: Jan-Olof Bodin, Alingsas; Ingemar Dagh, Hisingsbacka, both of Sweden

[73] Assignee: AB Volvo, Goteborg, Sweden

[21] Appl. No.: 734,696

[22] Filed: Oct. 21, 1996

Related U.S. Application Data

[60] Continuation-in-part of Ser. No. 348,819, Nov. 28, 1994, abandoned, which is a division of Ser. No. 78,180, filed as PCT/SE91/00861 Dec. 13, 1991, abandoned.

[30] Foreign Application Priority Data

Dec. 17, 1990 [SE] Sweden .............................. 90 04021-3

[51] Int. Cl.[6] .................................................. B62D 7/06
[52] U.S. Cl. ........................ 280/93; 280/96.1; 188/71.1
[58] Field of Search ................. 188/71.1, 73.1; 280/93, 96.1, 673, 674, 675

[56] References Cited

U.S. PATENT DOCUMENTS

| | | |
|---|---|---|
| 2,637,568 | 5/1953 | Booth et al. .............................. 280/673 |
| 3,233,704 | 2/1966 | Strain et al. . |
| 3,301,356 | 1/1967 | Pompa . |
| 3,441,288 | 4/1969 | Boughner ............................... 280/96.1 |
| 3,621,945 | 11/1971 | Spry . |
| 3,801,124 | 4/1974 | Afanador et al. .......................... 280/93 |
| 4,280,609 | 7/1981 | Cruise . |
| 4,379,501 | 4/1983 | Hagiwara et al. . |

FOREIGN PATENT DOCUMENTS

| | | |
|---|---|---|
| 1 800 161 | 9/1970 | Germany . |
| 2 254 933 | 11/1978 | Germany . |
| 2 520 767 | 4/1982 | Germany . |
| 60-151 434 | 8/1985 | Japan . |
| 224 812 | 3/1943 | Sweden . |
| 182 186 | 1/1963 | Switzerland . |
| 305 814 | 11/1968 | Switzerland . |
| 436 787 | 1/1985 | Switzerland . |

*Primary Examiner*—Matthew C. Graham
*Attorney, Agent, or Firm*—Young & Thompson

[57] ABSTRACT

Wheel axle for heavy motor vehicle consisting of a cast axle stub unit (10) with a mounting flange and a case spindle unit (9) to which the mounting flange is screwed fast with screws (16).

3 Claims, 3 Drawing Sheets

WHEEL AXLE

This application is a continuation-in-part of application Ser. No. 08/348,819, filed Nov. 28, 1994, now abandoned which in turn was a division of application Ser. No. 08/078,180, filed as PCT/SE91/00861 Dec. 13, 1991, now abandoned.

The present invention relates to a wheel axle for a non-driven, steerable vehicle wheel for heavy motor vehicles, comprising firstly, a spindle unit with a pair of axially spaced coaxial bores for receiving a king pin and with means disposed to support parts of a brake mechanism and, secondly, an axle stub unit, which is fixed to the wheel spindle unit and on which a wheel hub is intended to be mounted.

Conventional wheel axles for heavy vehicles are made of forged units with the spindle unit and the axle stub unit made together in one piece. However, forged units, in contrast to cast units, cannot be made in complicated shapes. In the case of wheel axle spindle units, these have such complicated shapes that after forging, they must be subjected to extensive milling, reaming and/or lathing to achieve their final shapes. The material in the forged units is high quality steel, and the waste in materials will be expensive when chips are cut away.

In wheel axle devices of this type known up to now, the braking mechanism is secured to the spindle unit with the aid of a separate intermediate flange or adapter, which is fixed to the spindle unit by means of screws.

The purpose of the present invention is in general to provide a wheel axle of the type described by way of introduction which, while fulfilling highly set strength requirements, can be manufactured at lower costs than wheel axles known up to now. A particular purpose is to achieve a wheel axle which solves special problems arising in connection with the use of disc brakes in heavy trucks.

This is achieved according to the invention by virtue of the fact that the spindle unit with associated support means for the brake mechanism is a cast unit, that the axle stub unit is a separate, forged unit and that the spindle unit and the axle stub unit are joined together.

The invention is based on the insight that the mechanical stresses on the axle stub unit are such that for reasons of strength it should be forged, but that the stresses on the spindle unit and the support means for the brake mechanism (the intermediate flange) permit casting of these components. The axle stub unit has an uncomplicated shape and can be forged relatively simply while the spindle unit and the brake support formed in one piece with each other can be given a very complicated shape when cast. The final result will be a wheel axle which can be manufactured of inexpensive material and with less material waste. At the same time, a design can be simply obtained which is more rigid than the known forged spindle unit, which has a separate intermediate flange for the brake mechanism.

The increased rigidity which can be achieved in the cast spindle unit has particular advantages in connection with disc brakes and in a preferred embodiment of the wheel axle according to the invention, said supporting means for the brake mechanism comprise a pair of mounting flanges provided with bores, to which flanges a disc brake caliper is intended to be screwed fast by means of screws in the bores.

In a disc brake that braking force is usually applied asymmetrically by the brake pads, in contrast to the brake shoes in a drum brake, which usually apply the braking force approximately symmetrically against the drum. The forces occurring due to the oblique loading of a brake disc in a heavy vehicle can be so great (at braking torque up to 20,000 Nm) that it is difficult, when using a forged spindle, to prevent a certain amount of deformation of the spindle or the support means for the brake mechanism, and the caliper and the brake disc will become misaligned resulting in oblique wear of the disc and the brake pad. When casting the spindle unit and brake torque, it is simple to achieve a single unit which is sufficiently rigid to absorb said forces without the risk of misalignment.

The invention will be described in more detail below with reference to examples shown in the accompanying drawings, in which.

Figure 1:
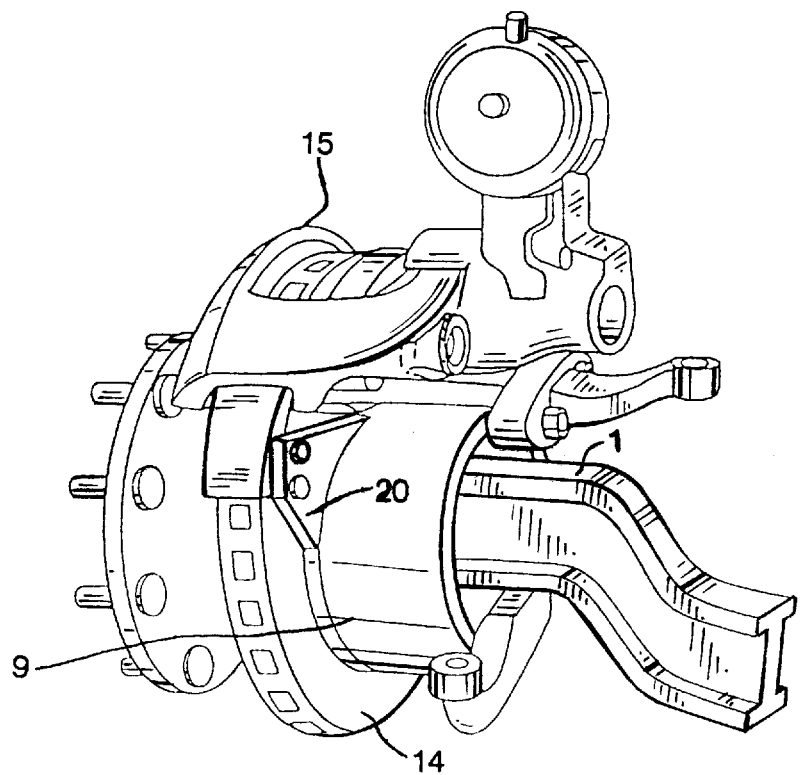
FIG. 1 shows a schematic perspective view of an embodiment of a wheel axle according to the invention.
Figure 2:
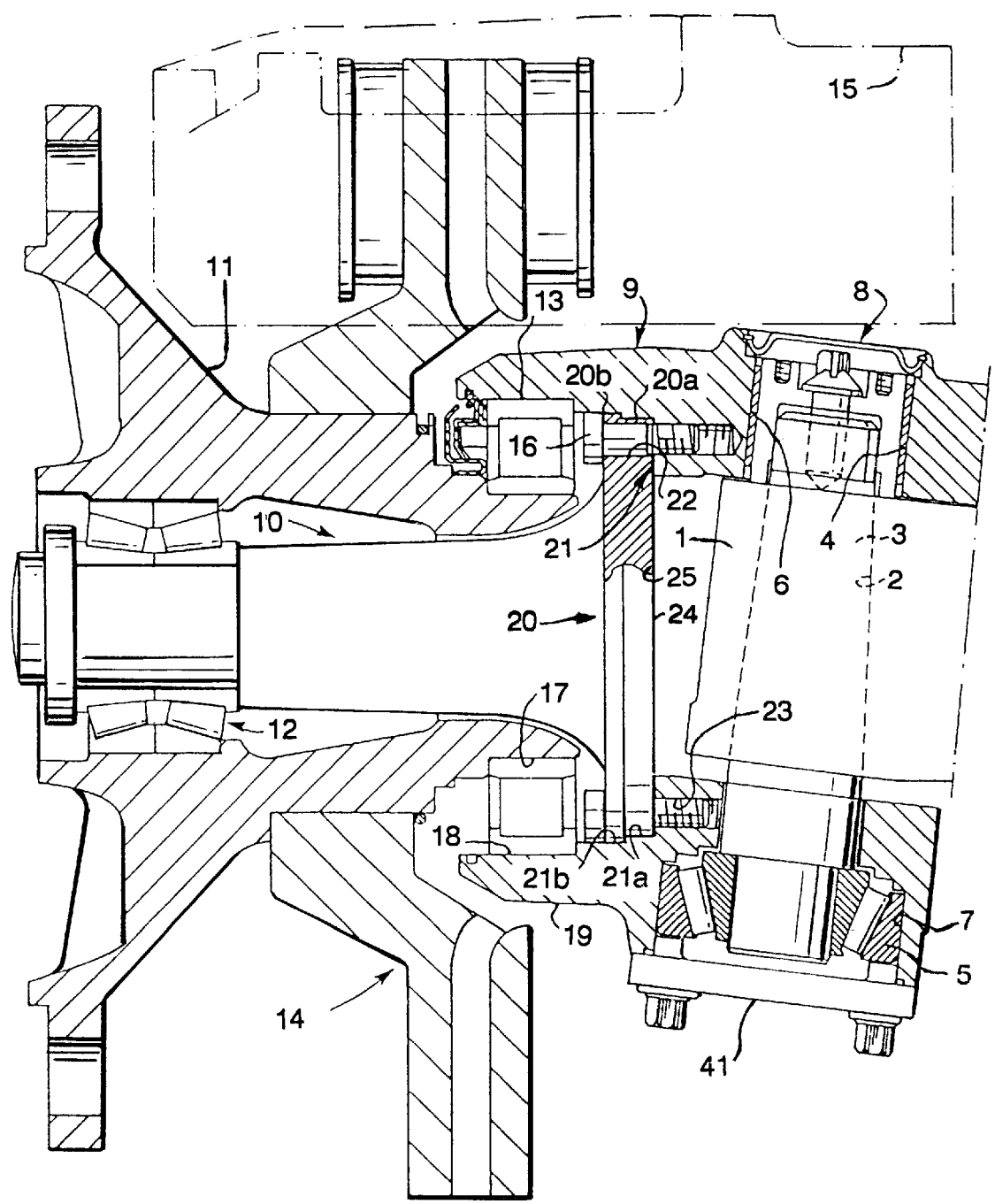
FIG. 2 shows a longitudinal section through a wheel axle corresponding to FIG. 1.
Figure 3:
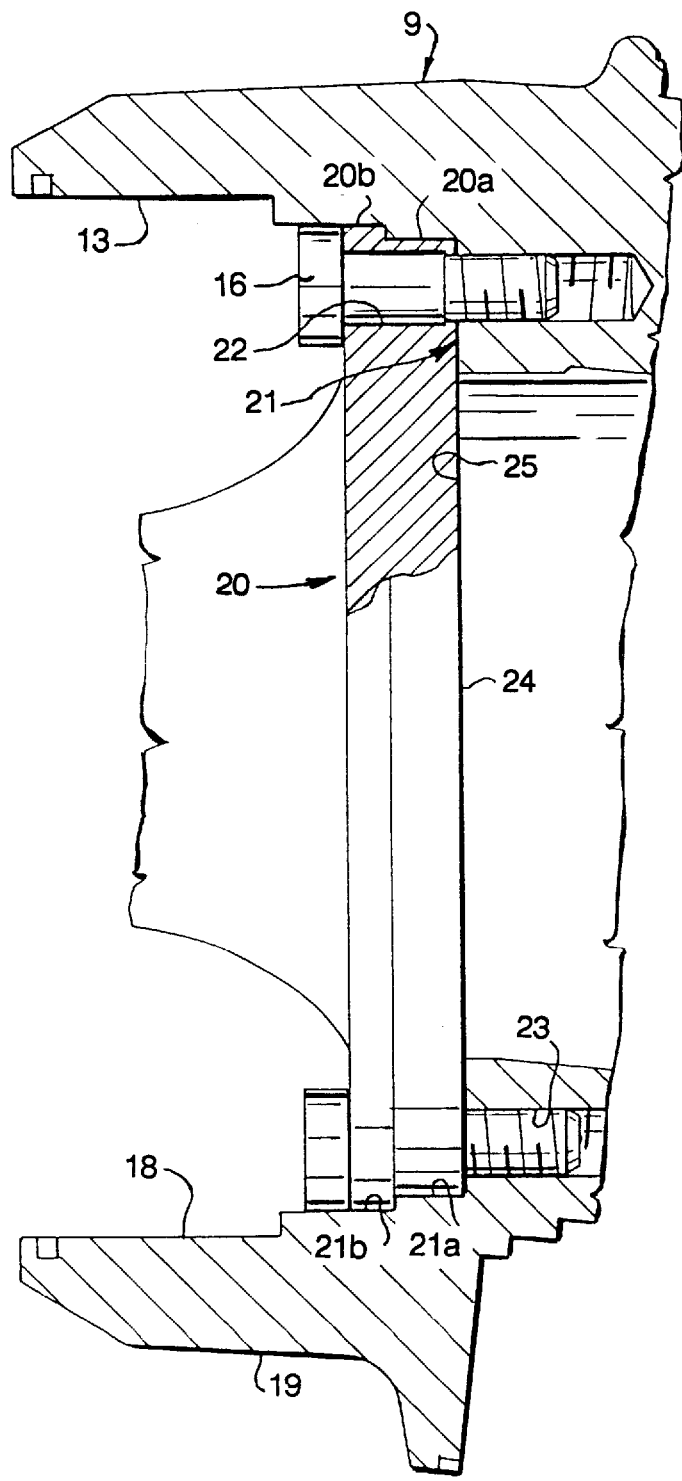
FIG. 3 shows an enlarged fragment of FIG. 2.

In FIGS. 1–3, the numeral 1 designates an outer end of a rigid front axle of a truck. The end of the axle has a conical bore 2 in which a king pin 3 is fixed. At its upper and lower ends the king pin 3 is mounted in bearings 4 and 5, which are mounted in upper and lower bores 6 and 7, respectively, in a wheel axle generally designated 8, which in the embodiment shown comprises a spindle unit 9 and an axle stub unit 10, on which a wheel hub 11 is mounted in distal and proximal bearing 12 and 13, respectively. The hub supports a brake disc 14 and the spindle unit 9 supports a brake caliper 15 which grips the disc. The brake caliper 15 is screwed securely to flanges 20 on the spindle unit 9.

As can be seen in FIGS. 2 and 3, the spindle unit 9 and the axle stub unit 10 are formed as two separate parts which are held firmly by screws 16. The spindle unit 9 is cast, while the axle stub is forged, to achieve the required strength properties in both the units by optimum production methods.

The hub 11 is mounted on the axle stub unit 10 in a distal bearing 12 comprising a pair of conical roller bearings and a proximal bearing 13 consisting of a roller bearing. This bearing 13 is arranged between an exterior bearing surface 17 on the hub 11 and an interior bearing surface 18 which is milled into a flange 19, which is cast in one piece with the spindle unit 9.

Also milled into the flange 19 is a recess 21 that receives the flange 20. Recess 21 is stepped, having a smaller diameter portion 21a at its bottom and a larger diameter portion 21b at its open end. Flange 20 is likewise stepped, with portions 20a and 20b fitting snugly into recess portions 21a and 21b, respectively.

The snug reception of flange 20 in recess 21 insures that radial forces on axle stub unit 10 will be transmitted from flange 20 directly to spindle unit 9, rather than via screws 16 to the spindle unit.

The provision of a stepped construction at 20a, 20b and 21a, 21b, facilitates assembly by reducing the risk of jamming when there is a tight fit between the edges of the flange and the recess, as is desirable in order to avoid the imposition of substantial stress on screws 16.

Screws 16, in turn, pass through bores 22 in flange 20 and are received screw threadedly in screw threaded bores 23 in the bottom of recess 21.

An end surface 24 of flange 20 abuts the bottom surface 25 of the recess 21.

Although the present invention has been described and illustrated in connection with the preferred embodiment, it is to be understood that modifications and variations may be resorted to without departing from the spirit or scope of the invention, as those skilled in this art will readily understand. Such modifications and variations are considered to be within the purview and scope of the present invention as defined by the appended claims.

What is claimed is:

1. In a wheel axle arrangement for a non-driven, steerable vehicle wheel for heavy motor vehicles, comprising a rigid axle beam, a king pin fixed in a bore in said axle beam, a spindle unit with a pair of axially spaced coaxial bores which contain bearing means mounted on opposite end portions of said king pin, the spindle unit having means to support parts of a brake mechanism, and an axle stub unit which is fixed to the spindle unit and on which a wheel hub is adapted to be mounted: the improvement wherein the spindle unit is a cast unit, the axle stub unit is a forged unit; and comprising, a flange on the axle stub unit and a recess in the spindle unit, said flange being received with substantially no radial clearance in said recess; and screws extending through said flange into threaded bores in the spindle unit to join the spindle unit to the axle stub unit, whereby radial forces acting between said flange and the spindle unit are transmitted directly between said flange on the spindle unit rather than through said screws.

2. A wheel axle arrangement as claimed in claim 1, wherein said means to support parts of a brake mechanism comprise a pair of mounting flanges having mounting bores, and a brake caliper for a disk brake adapted to be attached to said mounting flanges by means of further screws received in the mounting bores.

3. A wheel axle arrangement as claimed in claim 1, wherein said recess in said spindle unit has a stepped construction with a smaller diameter adjacent a bottom of said recess and a larger diameter adjacent an open end of said recess, said flange having a stepped construction that mates with the stepped construction of said recess.

* * * * *